United States Patent
Holmberg et al.

(10) Patent No.: US 9,214,858 B2
(45) Date of Patent: *Dec. 15, 2015

(54) INTERMEDIATE BUS ARCHITECTURE POWER SUPPLY CONTROLLER

(75) Inventors: Torbjörn Holmberg, Kalmar (SE); Magnus Karlsson, Oskarshamn (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/810,484

(22) PCT Filed: Jul. 16, 2010

(86) PCT No.: PCT/EP2010/060319
§ 371 (c)(1),
(2), (4) Date: Jan. 16, 2013

(87) PCT Pub. No.: WO2012/007055
PCT Pub. Date: Jan. 19, 2012

(65) Prior Publication Data
US 2013/0119962 A1    May 16, 2013

(51) Int. Cl.
G05F 1/577   (2006.01)
H02M 3/04   (2006.01)
H02J 1/00   (2006.01)
H02M 3/158   (2006.01)
H02M 1/00   (2007.01)

(52) U.S. Cl.
CPC .. *H02M 3/04* (2013.01); *H02J 1/00* (2013.01); *H02M 3/158* (2013.01); *H02M 2001/007* (2013.01); *H02M 2001/008* (2013.01)

(58) Field of Classification Search
CPC ..... H02M 3/155; H02M 3/156; H02M 3/158; H02M 3/33561; H02M 2001/007; H02M 2001/009; H02M 2001/0045; G05F 1/577; G05F 1/563
USPC .............................. 323/266, 267; 307/11, 12
See application file for complete search history.

(56) References Cited

U.S. PATENT DOCUMENTS

| | | | | |
|---|---|---|---|---|
| 7,888,919 | B2 * | 2/2011 | Dishman et al. | 323/266 |
| 8,179,705 | B2 * | 5/2012 | Chapuis | 363/141 |
| 2005/0281058 | A1 | 12/2005 | Batarseh | |
| 2012/0297104 | A1 * | 11/2012 | Thottuvelil et al. | 710/305 |

FOREIGN PATENT DOCUMENTS

WO    WO 2009/146259 A1    12/2009

* cited by examiner

*Primary Examiner* — Jue Zhang
*Assistant Examiner* — Kevin H Sprenger

(57) ABSTRACT

In an intermediate bus architecture power system, a voltage controller that generates control signals for controlling an intermediate bus voltage ($V_{IB}$) output from a first stage DC-to-DC power converter to at least one second stage DC-to-DC power converter via the intermediate voltage bus. A receiver receives values of the current input to the first stage converter, or the current and voltage output by the first stage converter. The controller determines a first value of an efficiency measure using the received values corresponding to a first $V_{IB}$, and determines a second value of the efficiency measure for a second $V_{IB}$ higher than the first $V_{IB}$. Control signals cause the first stage converter to set the $V_{IB}$ to a voltage higher than the second $V_{IB}$ if the second efficiency measure value represents a higher system efficiency than the first efficiency measure value, and to a voltage lower than the first $V_{IB}$ if the second efficiency measure value represents a lower system efficiency than the first efficiency measure value.

25 Claims, 8 Drawing Sheets

INTERMEDIATE BUS ARCHITECTURE POWER SUPPLY CONTROLLER

TECHNICAL FIELD

The present invention relates to the field of Intermediate Bus Architecture power systems and more specifically to control of the intermediate bus voltage in such systems.

BACKGROUND

The demand for ever faster and more complex signal and data processing in diverse fields of application has fuelled the need for new generations of signal processing systems having multiple high-performance ULSI circuits (e.g. processors, ASICs and FPGAs), which are characterised by their need for multiple low supply voltages, high levels of current demand and tight supply voltage regulation requirements. These needs are met by the so-called Intermediate Bus Architecture (IBA) power supply, which may provide a number of tightly-regulated voltages from an input power source via a two-stage voltage conversion arrangement.

FIG. 1 is a schematic of a conventional IBA power supply. The IBA power system 10 is a two-stage power distribution network comprising a first stage DC/DC converter 20 connected to an input power bus 30, which is typically at a voltage $V_{DCH}$ between 36-75 V, 18-36 V or 18-60 V. The first stage DC/DC converter 20 is connected via the Intermediate Voltage Bus (IVB) to the inputs of a number (K) of second stage DC/DC converters 50-1 to 50-K.

The first stage DC/DC converter 20, commonly referred to as an Intermediate Bus Converter (IBC), is preferably an isolated DC/DC converter. An IBA power supply having such a first stage DC/DC converter has the advantage of being more efficient and more cost-effective to manufacture by reason of the isolation from the input power bus, which generally requires the use of relatively costly components including a transformer, being provided at a single converter. Naturally, the IBC 20 may alternatively be non-isolated from the input power bus 30. The IBC 20 is typically implemented in the efficient form of a switched mode power supply (SMPS), which may be fully regulated or line regulated to convert the input power bus voltage $V_{DCH}$ to a lower intermediate bus voltage $V_{IB}$ on the IVB. However, in the interests of maximising the efficiency of the IBC, the IBC is typically chosen to provide an unregulated output voltage, taking the form of a fixed voltage conversion ratio DC/DC converter. Thus, the IBC 20 provides a fixed voltage conversion ratio (i.e. input-to-output ratio), most commonly 4:1, 5:1 or 6:1.

In the example of FIG. 1, each of the plurality of second stage DC/DC converters 50-1 to 50-K is a non-isolated buck regulator commonly referred to as a Point-of-Load (POL) converter or regulator, or a Point-of-Source regulator. In general, each of the second stage DC/DC converters may be isolated or non-isolated. However, where isolation is provided by the IBC 20, the POL regulators are preferably all non-isolated. A second stage DC/DC converter may take the form of an SMPS or a non-switched linearly-regulated Low Drop Out (LDO) regulator. Each POL (k) delivers a regulated voltage $V_{out\_k}$ to its load 60-k. In the example of FIG. 1, POL regulators 50-1 and 50-2 deliver power to a common load 60-1 (although, naturally, more than two POL regulators may deliver power to a common load). With the step-down ratio of the IBC 20 fixed at a pre-selected value, the voltage $V_{IB}$ on the IVB will of course vary with changes in the input voltage $V_{DCH}$, thus requiring the POL converters to be capable of operating over a range of input voltages, for example 3-15 V.

Although the IBC 20 and the POL regulators 50-1 to 50-K are buck regulators in the example of FIG. 1, their topology is not limited to such and may alternatively be Boost, Buck-Boost etc.

Efficiency is, of course, a critical parameter of any power supply system. The prevailing approach to improving the efficiency of IBA power systems has been to maximise the efficiencies at which the individual converters, i.e. the IBC 20 and POL converters 50-1 to 50-K, operate under typical load conditions. As noted above, designers have sought to increase the efficiency of the IBC by dispensing with voltage regulation altogether, thus avoiding the associated burden placed on the input power bus or other power source by the required regulation circuitry, and allowing the IBC to operate at an optimum duty cycle. The voltage conversion ratio of the IBC is consequently fixed. Since the POL converters operate most efficiently and reliably with a limited ratio between their input and output voltages (i.e. $V_{IB}$ and $V_{out\_k}$, respectively), the fixed value of the IBC's conversion ratio is selected such that the intermediate bus voltage $V_{IB}$ output by the IBC during expected operating conditions falls within a range of values at which the POL converters are able to operate most efficiently.

Despite the successes of the above approach, there still remains a need to improve the efficiency of IBA power systems.

SUMMARY OF THE INVENTION

The present invention was conceived with a view to improving the efficiency of an IBA power supply system. More specifically, the present invention was born out of the inventors' insight that mitigation of the distribution loss (that is, the loss through resistive heating) in the intermediate voltage bus, by adjustment of the intermediate bus voltage in response to a determination of a variable that provides a measure of the IBA system efficiency, such as the current or power input to, or dissipated in, the IBA power system, can yield a gain in the efficiency of the IBA power system which outweighs the inefficiency cost that is inherent in the regulation of the first stage DC/DC converter, thereby improving the overall efficiency of the IBA power system.

Furthermore, studies of the IBA system behaviour and, in particular, how the total power loss in the IBA system varies with the system's load, have revealed that the intermediate bus voltage level required for minimum power loss typically varies monotonically with the system's load. Embodiments of the present invention described herein below exploit this aspect of the system behaviour and thus allow the IBA system efficiency to be optimised quickly and in a computationally efficient way in response to changes in the power system's load. The intermediate bus voltage optimisation algorithms described herein have the additional advantage of putting very little noise onto the intermediate voltage bus.

According to the present invention, there is provided a voltage controller operable to generate control signals for controlling an intermediate bus voltage in an intermediate bus architecture power system, the intermediate bus voltage comprising a voltage output from a first stage DC-to-DC power converter to at least one second stage DC-to-DC power converter via the intermediate voltage bus in the intermediate bus architecture power system. The voltage controller comprises a receiver operable to receive values of the current input to the first stage DC-to-DC power converter or the current and voltage output by the first stage DC-to-DC power converter. The voltage controller further comprises an efficiency measuring unit operable to determine a measure of an efficiency of the intermediate bus architecture power system in accordance with the received values. The efficiency measuring unit is operable to determine a first value of the efficiency measure using the received values corresponding to a first intermediate bus voltage, and further to determine a second value of the efficiency measure using the received values corresponding to a second intermediate bus voltage higher than the first intermediate bus voltage. The voltage controller also includes a control signal generator operable to generate control signals to cause the first stage DC-to-DC converter to set the intermediate bus voltage to a voltage higher than the second intermediate bus voltage if the second efficiency measure value represents a higher system efficiency than the first efficiency measure value, and to a voltage lower than the first intermediate bus voltage if the second efficiency measure value represents a lower system efficiency than the first efficiency measure value.

The present invention also provides an intermediate bus architecture power system having a voltage controller as set out above.

The present invention further provides a method of generating control signals for controlling an intermediate bus voltage in an intermediate bus architecture power system, the intermediate bus voltage comprising a voltage output from a first stage DC-to-DC power converter to at least one second stage DC-to-DC power converter via the intermediate voltage bus in the intermediate bus architecture power system. The method comprises receiving values of the current input to the first stage DC-to-DC power converter, or the current and voltage output by the first stage DC-to-DC power converter. The method further comprises determining a measure of an efficiency of the intermediate bus architecture power system, in accordance with the received values, by: determining a first value of the efficiency measure using the received values corresponding to a first intermediate bus voltage; and determining a second value of the efficiency measure using the received values corresponding to a second intermediate bus voltage higher than the first intermediate bus voltage. The method also includes a process of generating control signals to cause the first stage DC-to-DC power converter to set the intermediate bus voltage to a voltage higher than the second intermediate bus voltage if the second efficiency measure value represents a higher system efficiency than the first efficiency measure value, and to a voltage lower than the first intermediate bus voltage if the second efficiency measure value represents a lower system efficiency than the first efficiency measure value.

The present invention further provides a computer program product comprising a computer-readable storage medium or a signal carrying computer program instructions which, if executed by a processor, cause the processor to perform a method as set out above.

In embodiments of the voltage controller described herein below, the efficiency measure whose values are determined and used to control the intermediate bus voltage comprises the current or the power input to the IBA power system, or the power loss therein.

It will be appreciated that the voltage controllers of the embodiments that will be described in the following cause the intermediate bus voltage to be automatically tuned towards a value that provides optimal system efficiency for the prevailing load conditions and to be adjusted to remain in the proximity of its optimal value, in a computationally efficient manner which introduces little noise onto the intermediate voltage bus.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

First Embodiment

Figure 1:
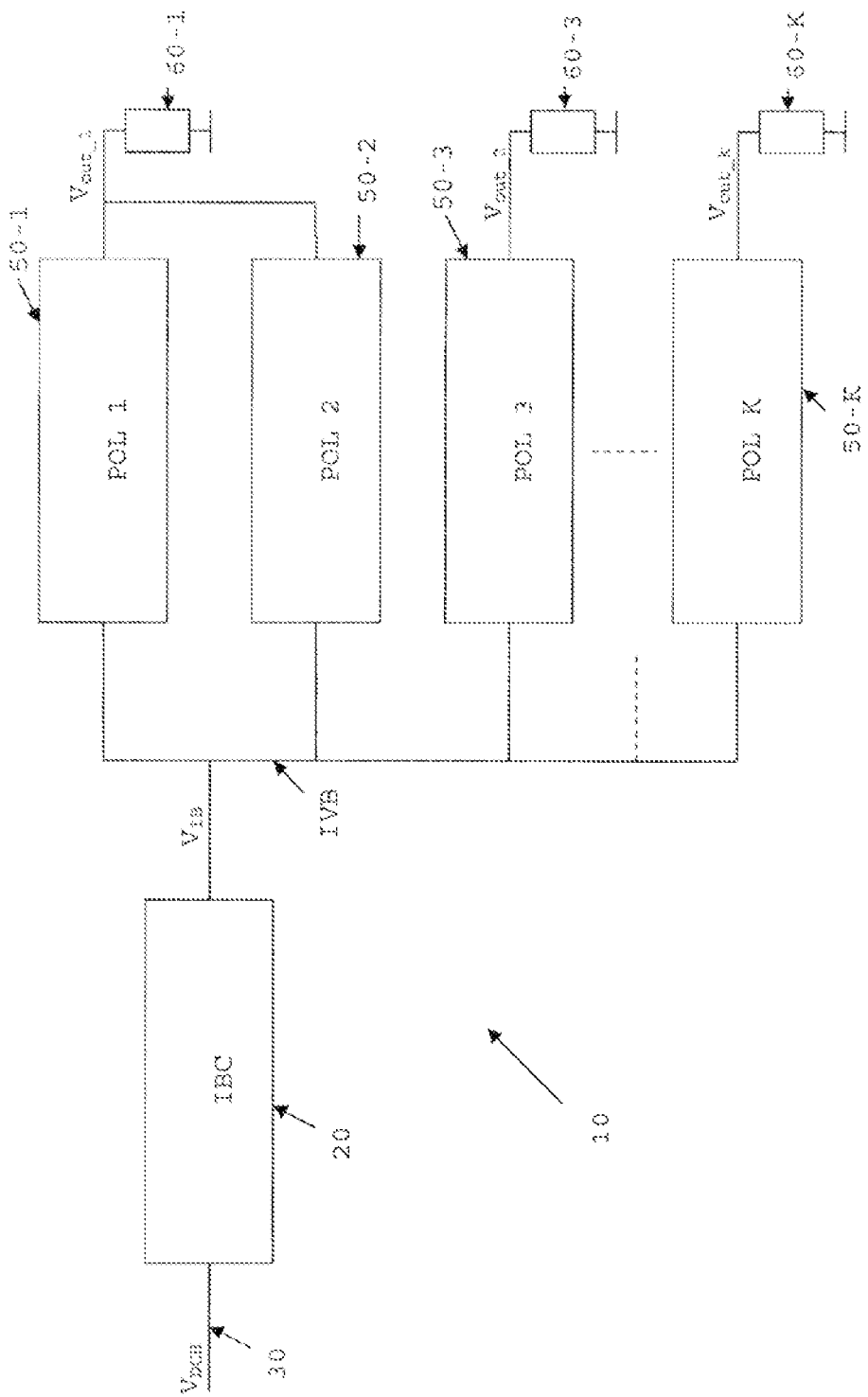
FIG. 1 is a schematic of a conventional IBA power system.
Figure 2:
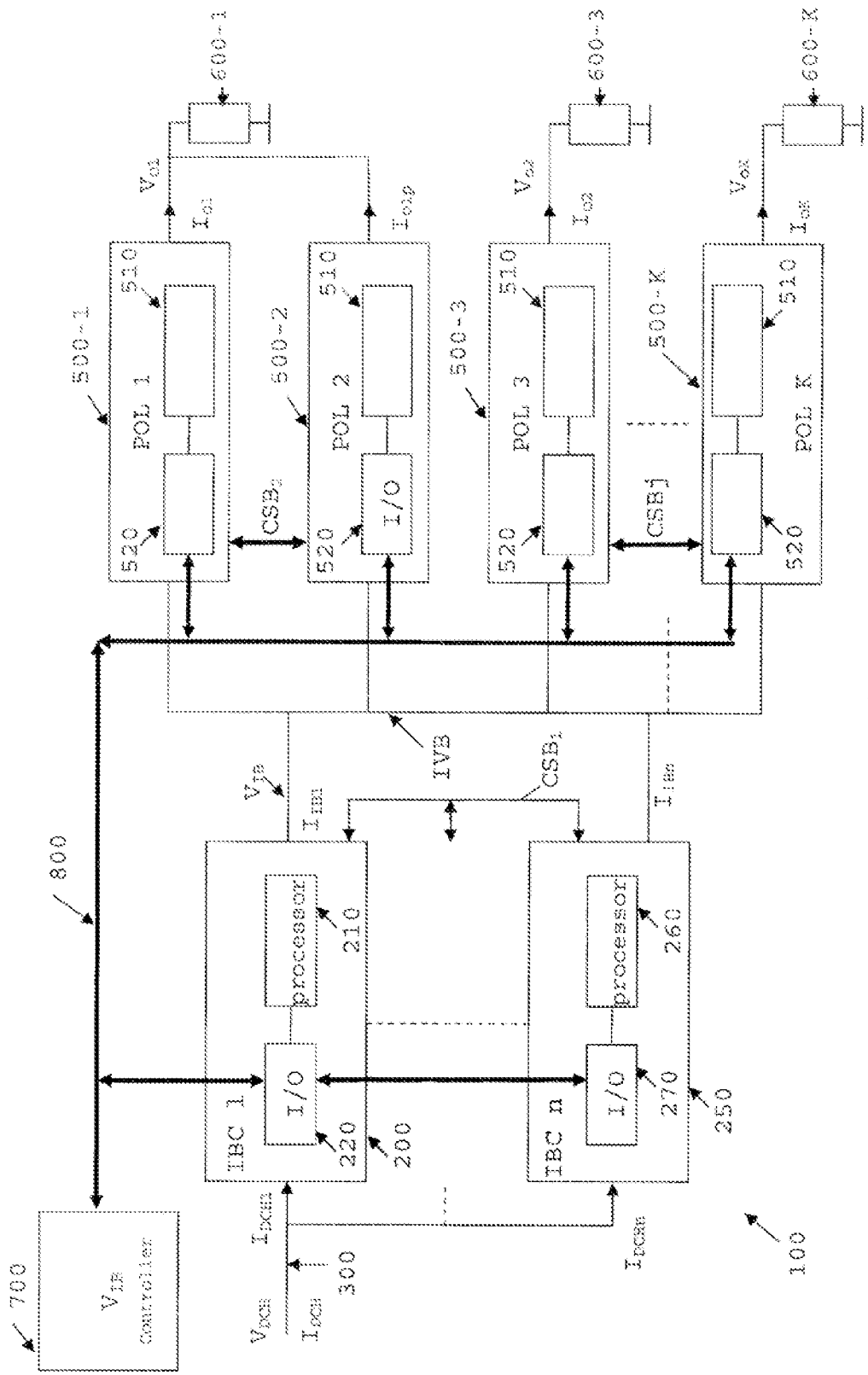
FIG. 2 is a schematic of an IBA power system embodying the present invention.

FIG. 2 is a schematic of an IBA power system 100 according to a first embodiment of the present invention. The IBA power system 100 is a two-stage power distribution network comprising a number n (where n≥1) of parallel-coupled first stage DC/DC converters 200 to 250, whose outputs are connected via an intermediate voltage bus (IVB) to a number K (where K≥1) of second stage DC/DC converters 500-1 to 500-K. An input power bus 300 at a voltage $V_{DCH}$ is connected to the inputs of the first stage DC/DC converters 200 to 250.

Each of the first stage DC/DC converters 200 to 250 is preferably an isolated DC/DC converter. An IBA power supply having such first stage DC/DC converters or IBCs has the advantage of being more efficient and more cost-effective to manufacture because isolation from the input power bus, which generally requires the use of relatively costly components including a transformer, is provided by a relatively small number of converters (or, where n=1, by a single converter). Alternatively, the IBCs may be non-isolated from the input power bus 300. The IBCs are preferably each implemented in the efficient form of an SMPS, which can be fully regulated or line regulated to convert the input power bus voltage to a lower intermediate bus voltage $V_{IB}$ on the IVB.

The IBC 200 of the present embodiment has a signal processor 210 and an input/output (I/O) interface 220 by which it can be digitally controlled and managed by a voltage controller 700, which will be described in detail below. Control signals and information are exchanged between the controller 700 and the IBC 200 via an information channel in the form of a Management Bus (MB) 800, which may be parallel or serial. The IBC 200 is capable of adjusting the value of $V_{IB}$ at its output in accordance with the received control signals. The remaining IBCs are similarly configured. For example, the nth IBC 250 has a signal processor 260 and an input/output (I/O) interface 270 by which it can be digitally controlled and managed by a voltage controller 700.

In general, two or more of the IBCs 200 to 250 may be provided in a current sharing arrangement such that they supply power in parallel to the second stage DC-to-DC converters. The information required for current sharing among these IBCs is exchanged between them via the Current Share Bus $CSB_1$. In the present embodiment, there is one Current Share Bus (CSB) in the first stage of the power converter system, although more than one such CSB may be used.

As shown in FIG. 2, the IBCs are connected via the IVB to the inputs of a number K of second stage DC/DC converters 500-1 to 500-K. In the present embodiment, each of the plurality of second stage DC/DC converters is a non-isolated POL regulator in the form of an SMPS. However, a second stage DC/DC converter is not limited to such and may alternatively be a non-switched converter, such as a Low Drop Out (LDO) (linear) regulator. Furthermore, some or all of the second stage DC/DC converters may alternatively be isolated but where isolation is provided by the IBCs, it is advantageous from a cost perspective for the second stage DC/DC converters to be non-isolated. Each POL (k) delivers a regulated output voltage $V_{out\_k}$ to its load 600-k.

In the present embodiment, POL regulators 500-1 and 500-2 are provided in a current sharing arrangement to deliver power to a common load 600-1. The information required for current sharing is exchanged between these POL regulators via the Current Share Bus $CSB_2$. However, more generally, in the POL stage there can be numerous Current Share Busses $CSB_1, \ldots CSB_j$, and current sharing can be performed between two up to m (where m≤K) POL regulators.

Each of the POL converters is provided with a signal processor 510 and an input/output (I/O) interface 520 by which it can be digitally controlled and managed by the controller 700 via the Management Bus 800.

Figure 3:
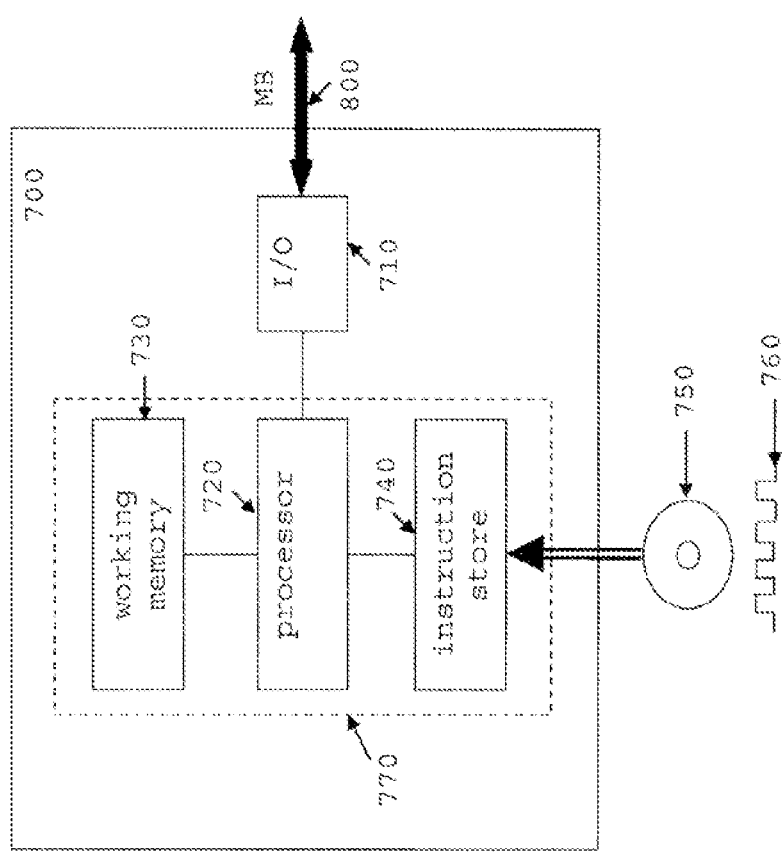
FIG. 3 shows the components of the voltage controller of FIG. 2.

FIG. 3 is a detailed illustration of the voltage controller 700 shown in FIG. 2. The controller 700 comprises an input/output (I/O) or receiving section 710 for receiving information from the IBCs 200 and 250 and preferably also the POL converters 500-1 to 500-K. The receiving section 710 is connected to the I/O interfaces of the IBCs and the POL converters via the MB 800, which enables an exchange of information and control signals therebetween. In particular, the receiving section 710 of the controller 700 of the present embodiment is configured to receive information concerning the IBCs' operating conditions, including values of their measured input currents $I_{DCH1}, \ldots I_{DCHn}$ and preferably their input voltage $V_{DCH}$. The receiving section may alternatively or additionally be configured to receive values of the output currents $I_{IB1}, \ldots I_{IBn}$ and output voltages of the IBCs, preferably together with values of the input voltage $V_{DCH}$. The receiving section 710 is further preferably configured to receive information concerning the POL regulators' operating conditions, including their respective measured output voltages $V_{ok}$ and output currents $I_{ok}$.

The receiving section 710 of the voltage controller is preferably further configured to receive other parameters from the IBCs and POL converters such as their duty cycles, temperatures, system status information for fault monitoring and diagnostics etc. These parameters may be used by the controller for any useful or desirable purpose, for example to implement safety features such as protective cut-offs which ensure that critical parameters such as the component temperatures do not exceed pre-determined thresholds. Alternatively, the controller 700 may forward some or all of the received information to a higher-level system which may be located off the board on which the IBA power system 100 is formed.

As shown in FIG. 3, the voltage controller 700 of the present embodiment further comprises a processor 720, a working memory 730 and an instruction store 740 storing computer-readable instructions which, when executed by the processor 720 cause the processor to perform the processing operations hereinafter described to evaluate a measure of the system efficiency (for example, the current or power input to the IBA system, or the power loss in the system) and to generate control signals for setting the intermediate bus voltage on the basis of this evaluation. The instruction store 740 may comprise a ROM which is pre-loaded with the computer-readable instructions. Alternatively, the instruction store 740 may comprise a RAM or similar type of memory, and the computer readable instructions can be input thereto from a computer program product, such as a computer-readable storage medium 750 such as a CD-ROM, etc. or a computer-readable signal 760 carrying the computer-readable instructions.

In the present embodiment, the combination 770 shown in FIG. 3 comprising the processor 720, the working memory 730 and the instruction store 740 constitutes an efficiency measuring unit and a control signal generator for generating control signals to cause the IBCs to set the intermediate bus voltage. The efficiency measuring unit and the control signal generator will now be described in detail with reference to FIGS. 2 and 3.

As shown in FIG. 3, the voltage controller 700 comprises an efficiency measuring unit 770 in communication with the receiving section 710. The efficiency measuring unit 770 of the present embodiment is arranged to determine a measure of the power input to the IBA power system by determining the current input to the IBCs 200 to 250, or both the input current and the input voltage, using values that have been received by the receiving section 710.

More specifically, the efficiency measuring unit 770 of the present embodiment is configured to calculate, as the measure of the system efficiency, the power input to the IBA power system, $P_{in}$, i.e. the product $V_{DCH}I_{DCH}=V_{DCH}\Sigma I_{DCHi}$, where the sum is from i=1 to n.

Alternatively, the current input to the IBA power system, $I_{DCH}$, may be taken as a measure of the system efficiency if the variations in the input voltage $V_{DCH}$ are negligible. As a further alternative, the power loss in the IBA power system may be taken as a measure of the system efficiency; that is, the difference between the power input to the IBA system via the IBCs (i.e. the product $I_{DCH}V_{DCH}$ in the embodiment of FIG. 2) and the power output by the IBA system via the POL converters 500-1 to 500-K (in other words, the sum over all of the POL converters of the respective power outputs as given by product of the output current and voltage, $\Sigma I_{ok}V_{ok}$, where the sum is from k=1 to K).

In any of these cases, the input current $I_{DCH}$ may be determined simply by summing the values of the currents $I_{DCHi}$ which have been measured by the IBCs 200 to 250, such that $I_{DCH}=\Sigma I_{DCHi}$, where the sum is from i=1 to n.

Alternatively, the total intermediate bus current $I_{IB}=\Sigma I_{IBi}$ (where the sum is over i) may be determined by summing the measured values of the currents $I_{IBi}$ output by the IBCs, and used by the efficiency measuring unit 770 in a power loss model of the IBCs to calculate the total input current $I_{DCH}$. The power loss function $P_{IBC}$ for an IBC can be expressed as a function of the input voltage $V_{DCH}$, the output voltage $V_{IB}$ and the output current $I_{IB}$, i.e. $P_{IBC}=f_{IBC}(V_{DCH}, V_{IB}, I_{IB})$. For better accuracy, it is preferable to also take into account the IBC's temperature T, so that $P_{IBC}=f_{IBC}(V_{DCH}, V_{IB}, I_{IB}, T)$. The input current is then simply $I_{DCH}=f_{IBC}/V_{DCH}=g_{IBC}(V_{DCH}, V_{IB}, I_{IB}, T)$. The function $f_{IBC}$ and/or $g_{IBC}$ can be obtained by power loss measurements of physical IBCs and modelled as a polynomial, typically of second order, whose coefficients can be obtained by Least Squares regression analysis, for example. Of course, other mathematical models may be used although polynomial functions are easy to calculate and are therefore preferred. Instead of Least Squares, other regression tools can be used, such as Least Absolute Deviation.

As noted above, the voltage controller of the present embodiment further comprises a control signal generator 770. The control signal generator 770 is arranged to generate, on the basis of the efficiency measure values determined by the efficiency measuring unit, control signals for use by the IBCs 200 to 250 to set the intermediate bus voltage $V_{IB}$. The control signal generator may transmit the generated control signals to the IBCs via the MB 800, preferably using the Power Management Bus (PMBus) protocol, at a timing determined thereby or in response to control signal requests made by the IBCs. The IBCs are configured to adjust the intermediate bus voltage using the received control signals.

The voltage controller 700 may be provided as a stand-alone hardware component, as illustrated in FIG. 2, or may be integrated as part of a Board Power Manager/Host Board Controller (not shown), an IBC or a POL converter, for example.

The processing operations performed by the voltage controller 700 in the present embodiment to generate control signals by which an IBC can adjust the intermediate bus voltage $V_{IB}$ will now be explained with reference to FIG. 4. For ease of explanation, the following description will focus on the operation of the IBA system 100 described above which has a single IBC, i.e. a system where n=1. However, the voltage optimisation algorithms described below are equally applicable to IBA systems having two or more IBCs.

Figure 4:
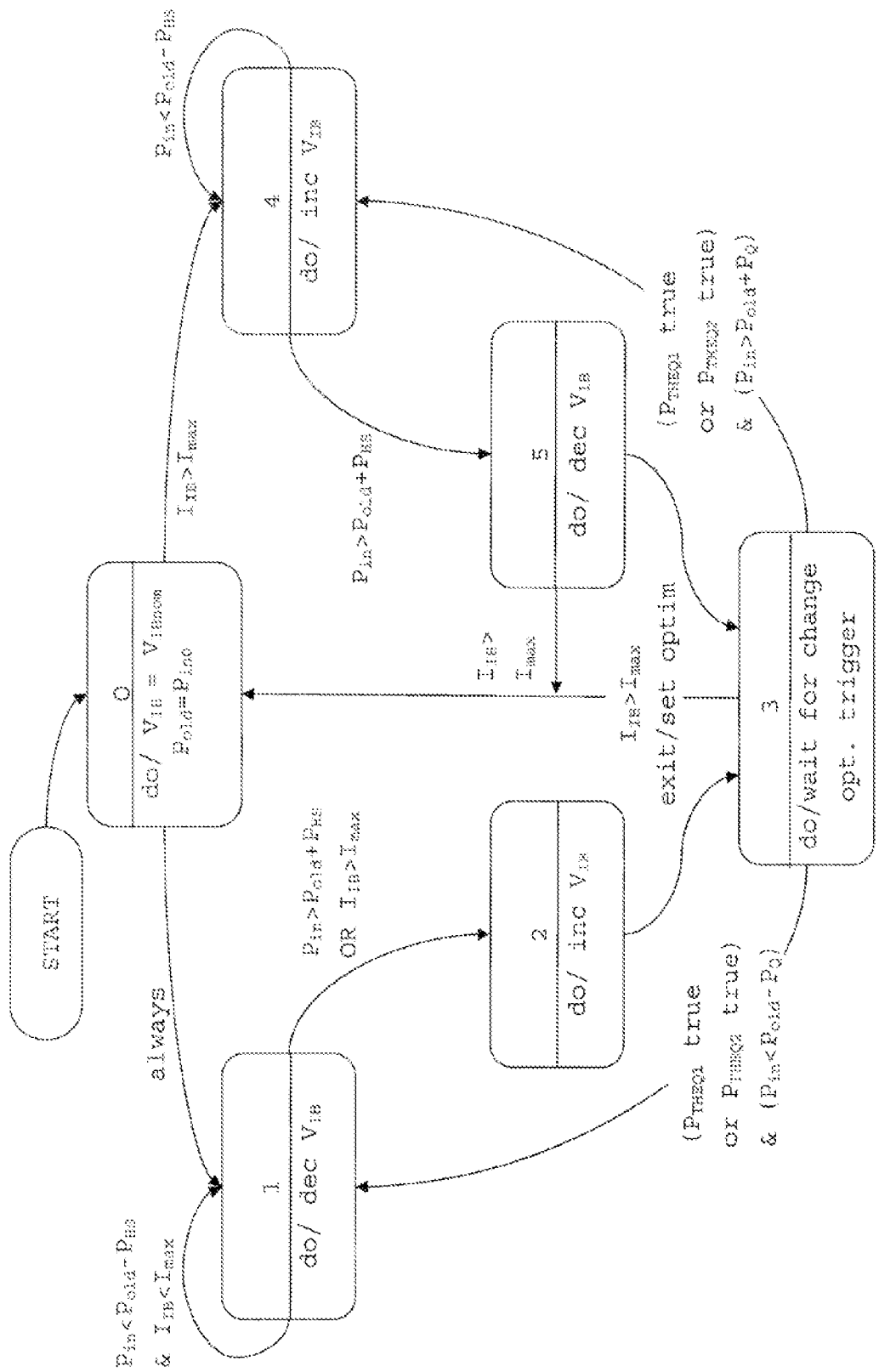
FIG. 4 is a state diagram illustrating an example of the "Set and Optimise" algorithm described herein, which is used to control the intermediate bus voltage in a first embodiment of the present invention.

FIG. 4 is a state diagram illustrating the "Set-and-Optimise" IBV optimisation algorithm employed by the voltage controller 700 in the present embodiment. During start-up of the IBA power system, at Box 0, the control signal generator 770 sets (for example, by ramping at a pre-set rate) the intermediate bus voltage $V_{IB}$ to an initial value $V_{IBnom}$, which is preferably selected to ensure safe operation of the system. In general, the initial $V_{IB}$ value should be set high enough so that the system efficiency increases as the intermediate bus voltage is decreased. The lowest acceptable initial value will depend on how the system operates at start-up. For example, it may be that after the IBV has been ramped up, the POL loads remain low while the load circuitry starts up and the IBV optimisation process is performed.

In this case, the load on the IBC will initially be low and consequently the optimum IBV value will also be relatively low, and $V_{IBnom}$ may therefore be a relatively small fraction of the maximum voltage the IBC can source. However, since the load behaviour at start-up is not always known, it is preferable to set $V_{IBnom}$ to a value which is 50-100% or, more preferably, 70-100% of the maximum voltage that the IBC can source.

The setting of the IBV to a high initial value at the start of the optimisation process has the advantage not only of providing a degree of over-current protection for the IBC, but also obviates the need for preliminary IVB measurement and decision steps in the voltage optimisation algorithm, since there will generally be an efficiency gain in decrementing the intermediate bus voltage to a value lower than $V_{IBnom}$. This makes the voltage optimisation faster and reduces voltage fluctuations on the IVB.

Once the intermediate bus voltage has been set to $V_{IBnom}$ and the voltage controller has received an indication that the power system initialisation has been completed successfully (which, for example, can be a "Power Good" PMBus signal), the voltage controller 770 issues an information request signal to the IBC 200 via the MB 800. The receiving section 710 of the voltage controller 700 then receives from the IBC 200, via the MB 800, the values of the input power bus voltage $V_{DCH}$ and the current $I_{DCH}$ input to the IBC 200. Although a measured value of $I_{DCH}$ is received in the present embodiment, the value of $I_{DCH}$ may alternatively be calculated by the efficiency measuring unit 770 using received values of the input voltage $V_{DCH}$, the intermediate bus voltage $V_{IB}$ and the total intermediate bus current $I_{IB}$, as explained above.

The efficiency measuring unit 770 of the present embodiment then calculates an initial quantised value $P_{in0}$ of the power input to the IBA system as an initial value of the efficiency measure, using the received values. The quantisation step size, $P_Q$, of the calculated power input values is stored in the instruction store 740 of the voltage controller 700. The calculated initial value $P_{in0}$ of the input power is then stored in the working memory 730 as the current value of a variable $P_{old}$.

The efficiency measuring unit 770 sets an intermediate bus voltage step size $\Delta V_{IB}$ to a value which may correspond to a default value stored in memory 740 or which may be selected by the efficiency measuring unit from a plurality of values. The control signal generator 770 generates a control signal instructing the IBC 200 to decrement the intermediate bus voltage from its current value $V_{IBnom}$ to $V_{IBnom}-\Delta B_{IB}$. The generated control signal is communicated to the IBC 200 via the MB 800, causing the IBC to decrement the intermediate bus voltage from $V_{IBnom}$ to $V_{IBnom}-\Delta V_{IB}$ in Box 1 of FIG. 4.

The voltage controller 700 then transmits an information request to the IBC 200 via the MB 800. In the present embodiment, the receiving section 710 receives from the IBC 200 new values of $V_{DCH}$ and $I_{DCH}$ (or alternatively the values of $V_{DCH}$, $V_{IB}$ and $I_{IB}$ required to calculate $I_{DCH}$) as well as a value indicative of the IBC's output current $I_{IB}$, all corresponding to the decremented value $V_{IBnom}-\Delta V_{IB}$ of the intermediate bus voltage.

The efficiency measuring unit 770 then calculates a new value for the input power, $P_{in}$, using the new values of $V_{DCH}$ and $I_{DCH}$. The efficiency measuring unit determines whether the new value of $P_{in}$ is smaller than the previous value (i.e. $P_{old}$) by at least a first predetermined amount, which is denoted by the hysteresis term $P_{HS}$ in FIG. 4. Use of the hysteresis term $P_{HS}$ allows the efficiency measuring unit to tolerate noise in the received voltage and current values and thus to more reliably determine whether the input power value corresponding to the IBV value of $V_{IBnom}-\Delta V_{IB}$ is significantly smaller than that corresponding to the previous IBV value of $V_{IBnom}$, and thereby to establish whether decrementing the IBV by $\Delta V_{IB}$ has resulted in a significant improvement in the system efficiency.

If the inequality $P_{in}<P_{old}-P_{HS}$ is satisfied in the first iteration, and the output current $I_{IB}$ the IBC 200 is determined by the efficiency measuring unit 770 to be lower than a threshold value $I_{max}$, the decrease of the IBV by $\Delta V_{IB}$ by the voltage controller in Box 1 is repeated in a following iteration, and the value of $P_{old}$ is replaced by the value of $P_{in}$ corresponding to an IBV of $V_{IBnom}-\Delta V_{IB}$. Herein, $I_{max}$ is the maximum current that the IBC can deliver continuously without sustaining damage, i.e. the maximum output current rating of the IBC. Above this level, a Current Limit is often specified for catastrophic protection, whose value is typically at least 20 & higher than $I_{max}$. The acquisition of new values of $I_{IB}$, $V_{DCH}$ and $I_{DCH}$ (this time corresponding to an IBV of $V_{IBnom}-$ $2\Delta V_{IB}$) and evaluation of the inequalities ($P_{in}<P_{old}-P_{HS}$) and ($I_{IB}<I_{max}$) and setting of the IBV (as necessary) is then repeated in the next iteration.

The above-described process of decrementing the IBV in Box 1 of FIG. 4 and evaluating the resulting changes in the power input to the IBA power system 100 and the current output by the IBC 200 may be performed iteratively by the voltage controller 700 in order to reduce the IBV to values which yield ever higher system efficiency.

On the other hand, if the inequality ($P_{in}<P_{old}-P_{HS}$) is not satisfied in an iteration and furthermore the input power value $P_{in}$ is greater than the value in the previous iteration, $P_{old}$, by more than a second predetermined amount (which, in this embodiment, is equal to the first predetermined amount $P_{HS}$) or the IBC's output current $I_{IB}$ exceeds the threshold value $I_{max}$, then the process proceeds to Box 2, where the control signal generator 770 generates control signals to cause the IBV to be incremented by the voltage increment $\Delta V_{IB}$. Where the transition to Box 2 was caused by the current limit $I_{max}$ being exceeded, bringing the intermediate bus voltage to the higher value of the previous iteration (or substantially the previous value) ensures that the output current $I_{IB}$ of the IBC 200 is brought back within its desired range. On the other hand, if the transition to Box 2 was due to the inequality ($P_{in} \leq P_{old}+P_{HS}$) being satisfied, reverting to the IBV value of the previous iteration (or substantially the IBV value of the previous iteration) results in an improved system efficiency. The resulting set value of the intermediate bus voltage is the most efficient that can be attained by the controller 700 without overloading the IBC 200. If neither of the inequalities ($P_{in}<P_{old}-P_{HS}$) and ($P_{in}>P_{old}+P_{HS}$) is satisfied and the IBC's output current is below the threshold $I_{max}$, the voltage controller continues to monitor $P_{in}$ in Box 1.

After the IBV has been incremented in Box 2, the process proceeds to Box 3, where the voltage controller 700 waits for a significant change in the load level of the IBA system to occur, before running the IBV optimisation process to set the IBV to a value which improves the efficiency of the IBA at the new load level.

More specifically, in Box 3, the efficiency measuring unit 770 monitors values of the input power bus voltage ($V_{DCH}$) and the input and output currents ($I_{DCH}$, $I_{IB}$) of the IBC 200, and calculates values of the power input to the IBA power system ($P_{in}$) in accordance with the received values. The efficiency measuring unit 770 analyses the calculated input power values and determines if the following trigger conditions hold true:

Condition $P_{THEQ1}$ (Optional trigger 1): two consecutive changes in $P_{in}$ are both larger than $|P_Q|$ and are of the same sign.

Condition $P_{THEQ2}$ (Optional trigger 2): a change in $P_{in}$ is larger than $|2P_Q|$.

In addition, the efficiency measuring unit 770 evaluates whether the calculated values of $P_{in}$ are smaller by at least a predetermined amount than the value ($P_{old}$) of the input power which was determined at the start of the monitoring process (i.e. after the IBV has been incremented in Box 2, or decreased in Box 5). If the efficiency measuring unit determines that one or both of the conditions $P_{THEQ1}$ and $P_{THEQ2}$ holds true, and that $P_{in}<P_{old}-P_Q$ (in other words, that the input power has decreased by at least a predetermined amount, here $P_Q$), it is established that a significant change in the IBA system load has occurred, and that the change is a decrease. In this case, process returns to Box 1, where the voltage controller 770 causes the signal generator to generate control signals to decrement the intermediate bus voltage by $\Delta V_{IB}$, and the iterative process of tuning the IBV to improve the system efficiency is repeated. The ability to set $P_Q$ to a value appropriate for the system in question makes the algorithm easy to customise.

In Box 3, the efficiency measuring unit 770 also evaluates whether each of the calculated values of $P_{in}$ is greater by at least a predetermined amount than the value ($P_{old}$) of the input power which was determined at the start of the monitoring process (i.e. after the IBV has been incremented in Box 2, or decreased in Box 5). If the efficiency measuring unit determines that one or both of the conditions $P_{THEQ1}$ and $P_{THEQ2}$ holds true, and that $P_{in} \leq P_{old}+P_Q$ (in other words, that the input power has increased by at least a predetermined amount, which is $P_Q$ in the present embodiment), it is established that a significant change in the IBA system load has occurred, and that the change is an increase. In this case, process proceeds to Box 4, where the voltage controller 770 causes the control signal generator to generate control signals to increment the intermediate bus voltage by $\Delta V_{IB}$, and the iterative process of tuning the IBV to improve the system efficiency is repeated.

More specifically, the control signal generator 770 generates a control signal instructing the IBC 200 to increment the intermediate bus voltage by $\Delta V_{IB}$ its current value. The generated control signal is communicated to the IBC 200 via the MB 800, causing the IBC to so increment the intermediate bus voltage in Box 4 of FIG. 4.

The voltage controller 700 then transmits an information request to the IBC 200 via the MB 800. In the present embodiment, the receiving section 710 receives from the IBC 200 new values of $V_{DCH}$ and $I_{DCH}$ (or alternatively the values of $V_{DCH}$, $V_{IB}$ and $I_{IB}$ required to calculate $I_{DCH}$) as well as a value indicative of the IBC's output current $I_{IB}$, all corresponding to the incremented value of the intermediate bus voltage.

The efficiency measuring unit 770 then calculates a new value for the input power, $P_{in}$, using the new values of $V_{DCH}$ and $I_{DCH}$, which correspond to the incremented value of the intermediate bus voltage. The efficiency measuring unit determines whether the new value of $P_{in}$ is smaller than the previous value (i.e. $P_{old}$) by at least a first predetermined amount, which is denoted by the hysteresis term $P_{HS}$ in FIG. 4.

If the inequality $P_{in}<P_{old}-P_{HS}$ is satisfied in the first iteration after Box 3, and the output current $I_{IB}$ of the IBC 200 is determined by the efficiency measuring unit 770 not to have exceeded a threshold value $I_{max}$, the increase of the IBV by $\Delta V_{IB}$ by the voltage controller in Box 4 is repeated in a following iteration, and the value of $P_{old}$ is replaced by the value of $P_{in}$ corresponding to the once-incremented value of the IBV. The acquisition of new values of $I_{IB}$, $V_{DCH}$ and $I_{DCH}$ (this time corresponding to a twice-incremented value of the IBV) and evaluation of the inequalities ($P_{in}<P_{old}-P_{HS}$) and ($I_{IB}>I_{max}$) and setting of the IBV (as necessary) is then repeated in the next iteration.

The above-described process of incrementing the IBV in Box 4 of FIG. 4 and evaluating the resulting changes in the power input to the IBA power system 100 and the current output by the IBC 200 may be performed iteratively by the voltage controller 700 in order to increase the IBV to values which yield ever higher system efficiency for the higher load level which triggered the exit from Box 3.

On the other hand, if the inequality ($P_{in}<P_{old}-P_{HS}$) is not satisfied in an iteration and the input power value $P_{in}$ is greater than the value in the previous iteration by more than a second predetermined amount (which, in this embodiment, is equal to the first predetermined amount $P_{HS}$), then it is determined that the previous increment has resulted in a lower system efficiency and the process proceeds to Box 5, where the IBV is decremented by $\Delta V_{IB}$ so as to return to the value set in the preceding iteration, which gives a higher system efficiency. The resulting set value of the intermediate bus voltage is the most efficient that the controller can set for the new load level. The process then returns to Box 3. However, if neither of the inequalities $(P_{in}<P_{old}-P_{HS})$ and $(P_{in} \leq P_{old}+P_{HS})$ is satisfied and the IBC's output current has not exceeded the threshold $I_{max}$, the voltage controller continues to monitor $P_{in}$ in Box 4. However, if after incrementing the IBV in Box 4 or decrementing it in Box 5, or during the monitoring process in Box 3, the processor 720, working memory 730 and instruction store 740, together functioning as a current monitor 770, determine that the output current $I_{IB}$ of the IBC 200 has exceeded the threshold value $I_{max}$, the process returns to Box 0, where the control signal generator generates control signals for causing the intermediate bus voltage to be set to the value of $V_{IBnom}$. This will cause the current to rapidly decrease, preventing the excessive output current level from damaging the IBC 200. Alternatively, if the output current $I_{IB}$ of the IBC 200 exceeds the threshold value $I_{max}$, the IBV may be set to a value different from $V_{IBnom}$, provided that the setting of the IBV to this value causes $I_{IB}$ to fall to or below the threshold $I_{max}$. For example, in order to maintain the power output of the IBC, the intermediate bus voltage should be changed from the value $V'_{IB}$ at which the value of the output current, $I'_{IB}$, exceeds $I_{max}$ to a new value at which $I_{IB}=I_{max}$, namely $I'_{IB}V'_{IB}/I_{max}$. The IBV is then optimised by the process described above, beginning at Box 1.

Second Embodiment

A second embodiment of the present invention will now be described with reference to FIG. 5. The components of the second embodiment are the same as those in the first embodiment described above. Accordingly, these components will not be described again here. However, the processing operations performed by the components are different, and these processing operations will now be described.

The main difference from the first embodiment is that the total current input to the IBA system, $I_{DCH}$, is used as a measure of the system efficiency in the present embodiment, instead of the input power $P_{in}$. A voltage controller according to the present embodiment is useful in IBA systems whose input power bus 300 is subject to voltage regulation so that variations in $V_{DCH}$ can be disregarded. The use of $I_{DCH}$ as the efficiency measure simplifies and speeds up the IBV optimisation process since the IBCs are not required to measure and report values of their input voltages to the voltage controller. As in the first embodiment, an IBA system having a single IBC will be considered in the following description, for simplicity.

Figure 5:
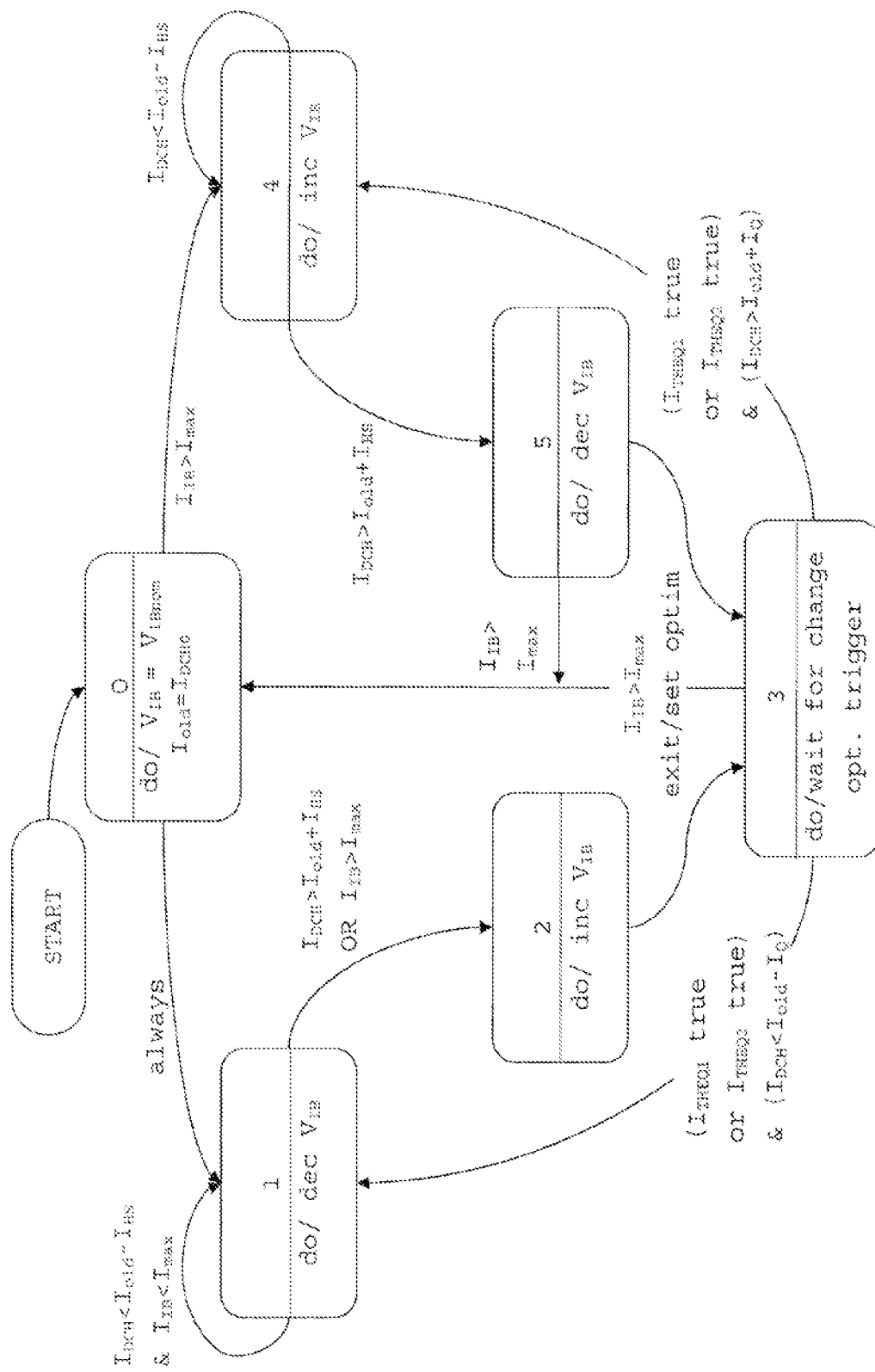
FIG. 5 is a state diagram illustrating another example of the "Set and Optimise" algorithm described herein, which is used to control the intermediate bus voltage in a second embodiment of the present invention.

FIG. 5 is a state diagram illustrating the "Set-and-Optimise" IBV optimisation algorithm employed by the voltage controller 700 in the present embodiment. The procedure from start-up up to the setting of the IBV in Box 0 is the same as that in FIG. 4 and will therefore not be described again here.

Once the intermediate bus voltage has been set to $V_{IBnom}$ and the voltage controller has received an indication that the power system initialisation has been completed successfully (which, for example, can be a "Power Good" PMBus signal), the voltage controller 770 issues an information request signal to the IBC 200 via the MB 800. The receiving section 710 of the voltage controller 700 then receives from the IBC 200, via the MB 800, the values of the current $I_{DCH}$ input to the IBC 200. Although a measured value of $I_{DCH}$ is received in the present embodiment, the value of $I_{DCH}$ may alternatively be calculated by the efficiency measuring unit 770 using a stored value of the input voltage $V_{DCH}$ and received values of $V_{IB}$ and $I_{IB}$, as explained in the first embodiment. It is therefore to be understood that the received values of $I_{DCH}$ referred to in the following could alternatively be replaced in the algorithm by values that have been calculated on the basis of $V_{DCH}$, $V_{IB}$ and $I_{IB}$.

The efficiency measuring unit 770 of the present embodiment then calculates an initial quantised value $I_{DCH0}$ of the current input to the IBA system as an initial value of the efficiency measure, using the received value. The quantisation step size, $I_Q$, of the calculated input current values is stored in the instruction store 740 of the voltage controller 700. The calculated initial value $I_{DCH0}$ of the input power is then stored in the working memory 730 as the current value of a variable $I_{old}$.

The efficiency measuring unit 770 sets an intermediate bus voltage step size $\Delta V_{IB}$ to a value which may correspond to a default value stored in memory 740 or which may be selected by the efficiency measuring unit from a plurality of values. The control signal generator 770 generates a control signal instructing the IBC 200 to decrement the intermediate bus voltage from its current value $V_{IBnom}$ to $V_{IBnom}-\Delta V_{IB}$, as in the first embodiment.

The voltage controller 700 then transmits an information request to the IBC 200 via the MB 800. In the present embodiment, the receiving section 710 receives from the IBC 200 a new value of $I_{DCH}$ as well as a value indicative of the IBC's output current $I_{IB}$, all corresponding to the decremented value $V_{IBnom}-\Delta V_{IB}$ of the intermediate bus voltage.

The efficiency measuring unit determines whether the new value of $I_{DCH}$ is smaller than the previous value (i.e. $I_{old}$) by at least a first predetermined amount, which is denoted by the hysteresis term $I_{HS}$ in FIG. 5. If the inequality $I_{DCH}<I_{old}-I_{HS}$ is satisfied in the first iteration, and the output current $I_{IB}$ of the IBC 200 is determined by the efficiency measuring unit 770 to be lower than a threshold value $I_{max}$, the decrease of the IBV by $\Delta V_{IB}$ by the voltage controller in Box 1 is repeated in a following iteration, and the value of $I_{old}$ is replaced by the value of $I_{DCH}$ corresponding to an IBV of $V_{IBnom}-\Delta V_{IB}$. The acquisition of new values of $I_{IB}$ and $I_{DCH}$ (this time corresponding to an IBV of $V_{IBnom}-2\Delta V_{IB}$) and evaluation of the inequalities $(I_{DCH}<I_{old}-I_{HS})$ and $(I_{IB}<I_{max})$ and setting of the IBV (as necessary) is then repeated in the next iteration.

The above-described process of decrementing the IBV in Box 1 of FIG. 5 and evaluating the resulting changes in the current input to the IBA power system 100 and the current output by the IBC 200 may be performed iteratively by the voltage controller 700 in order to reduce the IBV to values which yield ever higher system efficiency.

On the other hand, if the inequality $(I_{DCH}<I_{old}-I_{HS})$ is not satisfied in an iteration and furthermore $I_{DCH}$ is greater than the value in the previous iteration, $I_{old}$, by more than a second predetermined amount (which, in this embodiment, is equal to the first predetermined amount $I_{HS}$) or the IBC's output current $I_{IB}$ exceeds the threshold value $I_{max}$, then the process proceeds to Box 2, where the control signal generator 770 generates control signals to cause the IBV to be incremented by the voltage increment $\Delta V_{IB}$. Where the transition to Box 2 was caused by the current limit $I_{max}$ being exceeded, bringing the intermediate bus voltage to the higher value of the previous iteration (or substantially the previous value) ensures that the output current $I_{IB}$ of the IBC 200 is brought back within its desired range. On the other hand, if the transition to Box 2 was due to the inequality $(I_{DCH}>I_{old}+I_{HS})$ being satisfied, reverting to the IBV value of the previous iteration (or substantially the IBV value of the previous iteration) results in an improved system efficiency. The resulting set value of the intermediate bus voltage is the most efficient that can be attained by the controller 700 without overloading the IBC 200. If neither of the inequalities ($I_{DCH} < I_{old} - I_{HS}$) and ($I_{DCH} > I_{old} + I_{HS}$) is satisfied and the IBC's output current is below the threshold $I_{max}$, the voltage controller continues to monitor $I_{DCH}$ in Box 1. After the IBV has been incremented in Box 2, the process proceeds to Box 3, where the voltage controller 700 waits for a significant change in the load level of the IBA system to occur, before running the IBV optimisation process to set the IBV to a value which improves the efficiency of the IBA at the new load level.

More specifically, in Box 3, the efficiency measuring unit 770 monitors values of the input and output currents ($I_{DCH}$, $I_{IB}$) of the IBC 200. The efficiency measuring unit 770 analyses the received values and determines if the following trigger conditions hold true:

Condition $I_{THEQ1}$ (Optional trigger 1): two consecutive changes in $I_{DCH}$ are both larger than $|I_Q|$ and are of the same sign.

Condition $I_{THEQ2}$ (Optional trigger 2): a change in $I_{DCH}$ is larger than $|2I_Q|$.

In addition, the efficiency measuring unit 770 evaluates whether the values of $I_{DCH}$ are smaller by at least a predetermined amount than the value ($I_{old}$) which was determined at the start of the monitoring process (i.e. after the IBV has been incremented in Box 2, or decreased in Box 5). If the efficiency measuring unit determines that one or both of the conditions $I_{THEQ1}$ and $I_{THEQ2}$ holds true, and that $I_{DCH} < I_{old} - I_Q$ (in other words, that the input current has decreased by at least a predetermined amount, here $I_Q$), it is established that a significant change in the IBA system load has occurred, and that the change is a decrease. In this case, process returns to Box 1, where the voltage controller 770 causes the signal generator to generate control signals to decrement the intermediate bus voltage by $\Delta V_{IB}$, and the iterative process of tuning the IBV to improve the system efficiency is repeated.

In Box 3, the efficiency measuring unit 770 also evaluates whether each of the values of $I_{DCH}$ is greater by at least a predetermined amount than the value ($I_{old}$) of the input current which was determined at the start of the monitoring process (i.e. after the IBV has been incremented in Box 2, or decremented in Box 5). If the efficiency measuring unit determines that one or both of the conditions $I_{THEQ1}$ and $I_{THEQ2}$ holds true, and that $I_{DCH} \leq I_{old} + I_Q$ (in other words, that the input current has increased by at least a predetermined amount, which is $I_Q$ in the present embodiment), it is established that a significant change in the IBA system load has occurred, and that the change is an increase. In this case, process proceeds to Box 4, where the voltage controller 770 causes the control signal generator to generate control signals to increment the intermediate bus voltage by $\Delta V_{IB}$, and the iterative process of tuning the IBV to improve the system efficiency is repeated.

More specifically, the control signal generator 770 generates a control signal instructing the IBC 200 to increment the intermediate bus voltage by $\Delta V_{IB}$ from its current value. The generated control signal is communicated to the IBC 200 via the MB 800, causing the IBC to so increment the intermediate bus voltage in Box 4 of FIG. 5.

The voltage controller 700 then transmits an information request to the IBC 200 via the MB 800. In the present embodiment, the receiving section 710 receives from the IBC 200 new values of $I_{DCH}$ as well as a value indicative of the IBC's output current $I_{IB}$, all corresponding to the incremented value of the intermediate bus voltage.

The efficiency measuring unit 770 then determined a new value for the input current corresponding to the incremented value of the intermediate bus voltage. The efficiency measuring unit determines whether the new value of $I_{DCH}$ is smaller than the previous value (i.e. $I_{old}$) by at least a first predetermined amount, which is denoted by the hysteresis term $I_{HS}$ FIG. 5.

If the inequality $I_{DCH} < I_{old} - I_{HS}$ is satisfied in the first iteration after Box 3, and the output current $I_{IB}$ of the IBC is determined by the efficiency measuring unit not to have exceeded a threshold value $I_{max}$, the increase of the IBV by $\Delta V_{IB}$ by the voltage controller in Box 4 is repeated in a following iteration, and the value of $I_{old}$ is replaced by the value of $I_{DCH}$ corresponding to the once-incremented value of the IBV. The acquisition of new values of $I_{IB}$ and $I_{DCH}$ (this time corresponding to a twice-incremented value of the IBV) and evaluation of the inequalities ($I_{DCH} < I_{old} - I_{HS}$) and ($I_{IB} \leq I_{max}$) and setting of the IBV (as necessary) is then repeated in the next iteration.

The above-described process of incrementing the IBV in Box 4 of FIG. 5 and evaluating the resulting changes in the current input to the IBA power system 100 and the current output by the IBC 200 may be performed iteratively by the voltage controller 700 in order to increase the IBV to values which yield ever higher system efficiency for the higher load level which triggered the exit from Box 3.

On the other hand, if the inequality ($I_{DCH} < I_{old} - I_{HS}$) is not satisfied in an iteration and the input current value $I_{DCH}$ is greater than the value in the previous iteration by more than a second predetermined amount (which, in this embodiment, is equal to the first predetermined amount $I_{HS}$), then it is determined that the previous increment has resulted in a lower system efficiency and the process proceeds to Box 5, where the IBV is decremented by $\Delta V_{IB}$ so as to return to the value set in the preceding iteration, which gives a higher system efficiency. The resulting set value of the intermediate bus voltage is the most efficient that the controller can set for the new load level. The process then returns to Box 3. However, if neither of the inequalities ($I_{DCH} < I_{old} - I_{HS}$) and ($I_{DCH} \leq I_{old} + I_{HS}$) is satisfied and the IBC's output current has not exceeded the threshold $I_{max}$, the voltage controller continues to monitor $I_{DCH}$ in Box 4.

However, if after incrementing the IBV in Box 4 or decrementing it in Box 5, or during the monitoring process in Box 3, the processor 720, working memory 730 and instruction store 740, together functioning as a current monitor 770, determine that the output current $I_{IB}$ of the IBC 200 has exceeded the threshold value $I_{max}$, the process returns to Box 0, where the control signal generator generates control signals for causing the intermediate bus voltage to be set to the value of $V_{IBnom}$. This will cause the current to rapidly decrease, preventing the excessive output current level from damaging the IBC 200. Alternatively, if the output current $I_{IB}$ of the IBC 200 exceeds the threshold value $I_{max}$, the IBV may be set to a value different from $V_{IBnom}$, provided that the setting of the IBV to this value causes $I_{IB}$ to fall to or below the threshold $I_{max}$. For example, in order to maintain the power output of the IBC, the intermediate bus voltage should be changed from the value $V'_{IB}$ for which the output current value, $I'_{IB}$, exceeds $I_{max}$ to a new value at which $I_{IB} = I_{max}$ namely $I'_{IB} V'_{IB}/I_{max}$. The IBV is then optimised by the process described above, beginning at Box 1.

Third Embodiment

A third embodiment of the present invention will now be described with reference to FIG. 6. The components of the third embodiment are the same as those in the first and second embodiments described above. Accordingly, these components will not be described again here. However, the processing operations performed by the components are different, and these processing operations will now be described.

The present embodiment differs from the first and second embodiments by the approach taken to combating the risk of over-current in the IBC. Whereas in the first and second embodiments the voltage controller 700 is configured to set the intermediate bus voltage to a higher value (e.g. to the voltage $V_{IBnom}$) when the IBC's output current $I_{IB}$ is found to have exceeded a threshold value $I_{max}$ under certain circumstances, as explained above, the voltage controller of the present embodiment is arranged to keep the IBC's output current $I_{IB}$ below a pre-defined threshold value, which may be equal to $I_{max}$ or only a portion thereof, preferably above 70% but less than 100% of $I_{max}$. The optimum setting of the threshold value represents a compromise between achieving a high level of IBV optimisation and a wide current margin for safely handling temporary increases in the load level. Thus, in the present embodiment, the lowest value to which the intermediate bus voltage is tuned by the voltage controller 700 will be higher than that in the first embodiment, allowing for a current margin.

Figure 6:
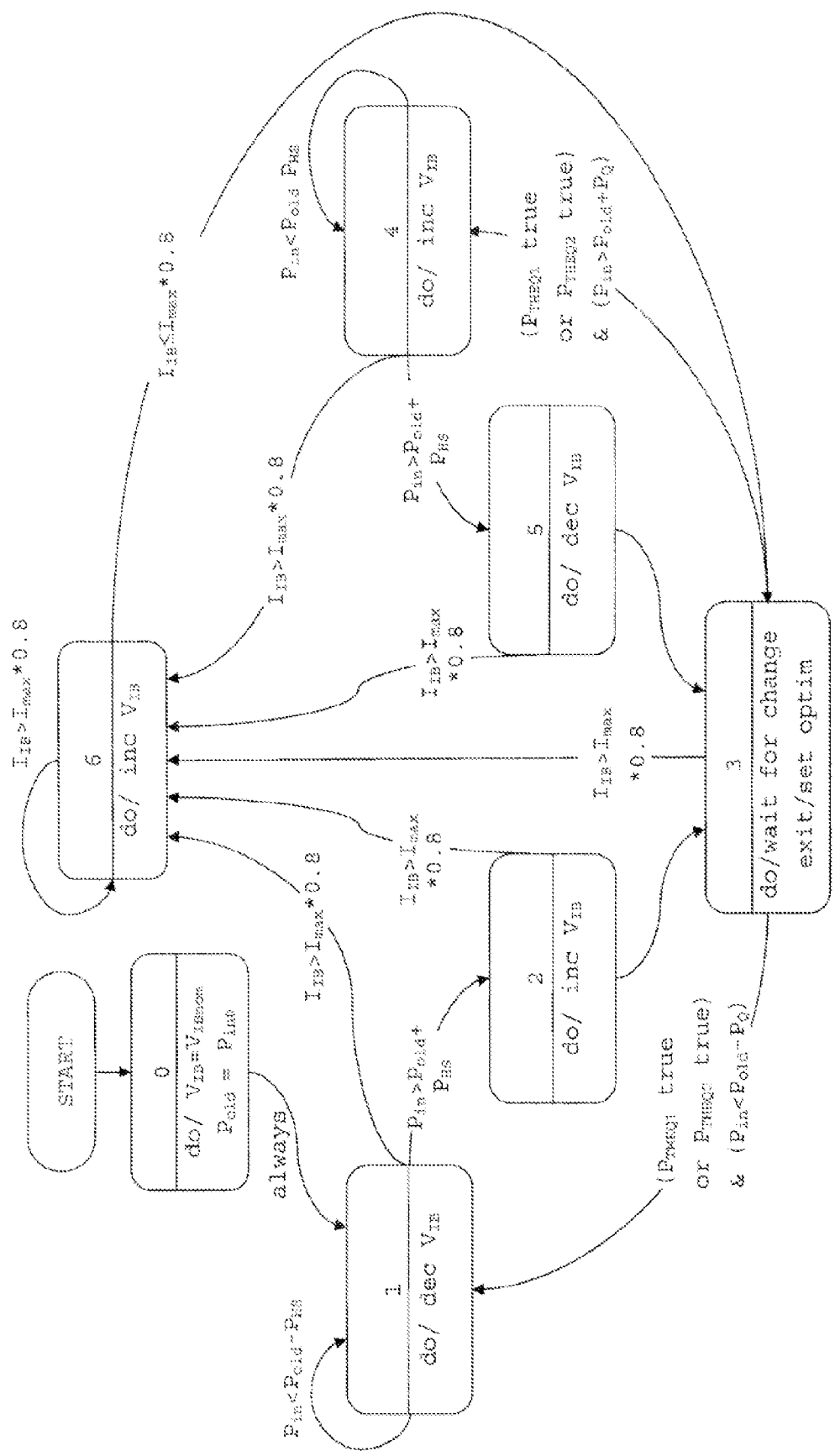
FIG. 6 is a state diagram illustrating an example of the "Current Margin" algorithm described herein, which is used to control the intermediate bus voltage in a third embodiment of the present invention.

FIG. 6 is a state diagram illustrating an example of the "Current Margin" algorithm of the present embodiment, which is used to control the intermediate bus voltage.

In FIG. 6, Boxes 0 to 5 and the processes associated therewith are the same as those which have been described above for the first embodiment. These aspects of the voltage optimisation algorithm will therefore not be described again here. The algorithm of FIG. 6 differs from that of FIG. 4 in that the process proceeds to a new box, Box 6, if at any point of the voltage optimisation process or the monitoring process in Box 3 the output current $I_{IB}$ of the IBC is determined to exceed a threshold value that is only a portion of $I_{max}$, which is 0.8*$I_{max}$ in the present embodiment. The determination is made by the processor 720, working memory 730 and instruction store 740, which together function as a current monitor. In Box 6, the current monitor causes the signal generator 770 to generate control signals to iteratively increment the set value of the IBV (preferably in steps of $\Delta V_{IB}$) until $I_{IB}$ falls to or below the threshold value of 0.8*$I_{max}$ or the until the bus voltage $V_{IB}$ exceeds a pre-determined maximum value, $V_{IBmax}$, whereupon the process returns to Box 3. If the output power exceeds the maximum rating for the IBC, the voltage controller is arranged to shut down the IBA system since it does not help to optimise the bus voltage if the bus current cannot be decreased enough. The maximum output voltage of the IBC sets the limit of the maximum output power.

Of course, it will be appreciated that the above-described modification of the first embodiment can also me made to the second embodiment.

[Simulation Results]

Figure 7:
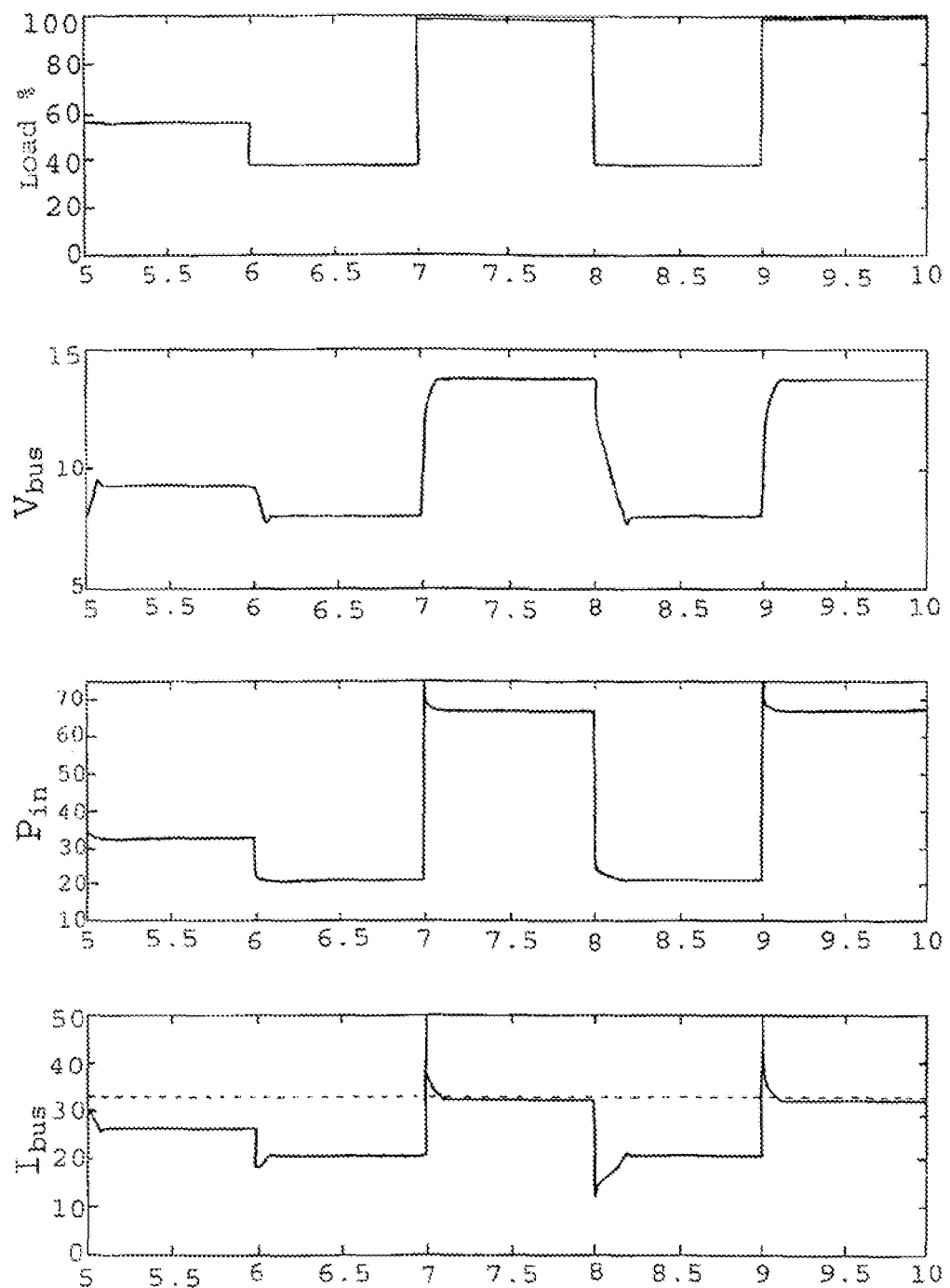
FIG. 7 shows simulated time variations of the power system load, intermediate bus voltage, input power and the intermediate bus current, which are obtained using the "Set and Optimise" algorithm described herein.
Figure 8:
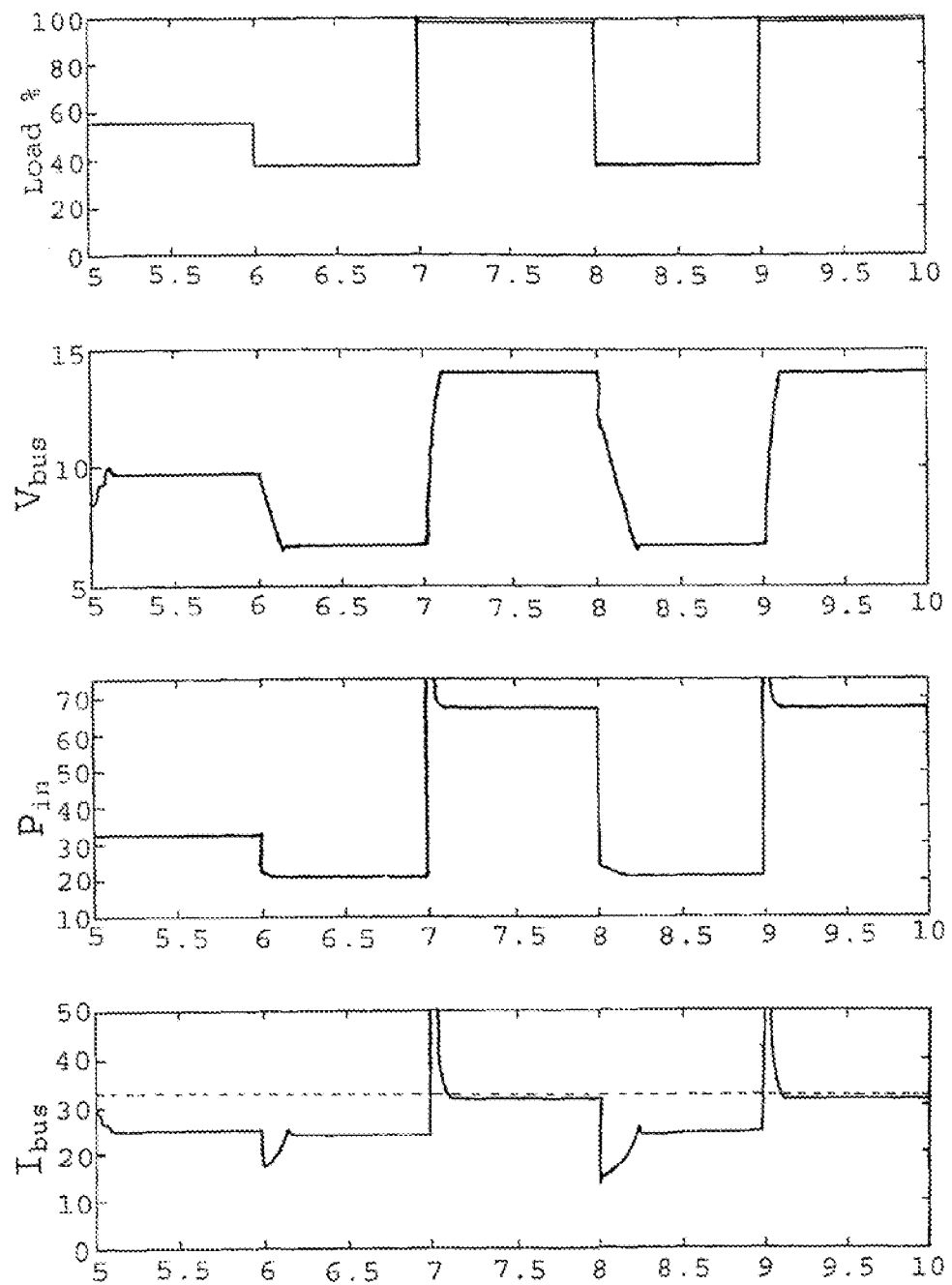
FIG. 8 shows simulated time variations of the power system load, intermediate bus voltage, input power and the intermediate bus current, which are obtained using the "Current Margin" algorithm described herein.

The variations in various parameters of the IBA system during the IBV optimisation processes according to the above-described "Set and Optimise" and "Current Margin" algorithms have been simulated, and the results are shown in FIGS. 7 and 8.

FIG. 7 shows simulated time variations of the power system load, intermediate bus voltage $V_{IB}$, input power $P_{in}$, and the intermediate bus current $I_{IB}$, which have been obtained using the "Set and Optimise" algorithm. FIG. 8 shows variations of the same system parameters for the case where the "Current Margin" algorithm has been used in the simulation. These results demonstrate that the IBV can be optimised using these algorithms quickly and in a way which introduces little voltage ripple onto the intermediate voltage bus.

[Modifications and Variations]

Many modifications and variations can be made to the embodiments described above.

For example, in the embodiments described above the functions of the efficiency measuring unit, the control signal generator and the current monitor are provided by a programmable processing apparatus having a processor 720 which performs the efficiency measure determination and the control signal generation operations in accordance with software instructions stored in instructions store 740. However, it will be appreciated that one or more of the efficiency measuring unit, the control signal generator and the current monitor may be configured otherwise. For example, the voltage controller may comprise non-programmable hardware (e.g. an ASIC) that is dedicated to serving the functions of the efficiency measuring unit and the control signal generator.

Although the IBC 200 and the POL regulators 500-1 to 500-K are buck regulators in the above embodiments, their topology is not limited to such and may alternatively be Boost, Buck-Boost etc.

In the above embodiments, the current input to the IBA system 100 and the power input to the system provide convenient measures of the system efficiency. However, any other appropriate efficiency measure can be used.

For example, the efficiency measuring unit 770 may alternatively determine the power loss in the IBA system as a measure of the system efficiency, by calculating the difference between the power input to the system and the power output thereby. The input power $P_{in}=I_{DCH}V_{DCH}$ may be determined using a measured value of the input current $I_{DCH}$ that has been received from the IBC 200 or a value calculated using received values of $V_{IB}$ and $I_{IB}$ together with a received or (where $V_{DCH}$ can be treated as constant) a stored value of the input bus voltage $V_{DCH}$, as explained above. The power output by the IBA system, $P_{out}=\Sigma I_{ok}V_{ok}$ (where the sum is from k=1 to K), may be determined using received values of the currents $I_{o1} \ldots, I_{oK}$ output by the POL regulators 500-1 to 500-K together with received values of the POLs' output voltages $V_{o1} \ldots, V_{oK}$ or (where the POLs' output voltages can be treated as constant) stored values of the output voltages. It will therefore be appreciated that the IBA system power loss, $P_{loss}=P_{in}-P_{out}$, can be employed instead of the system input power $P_{in}$ in the above-described first embodiment. With this modification, the voltage optimisation procedure may proceed as described above in the first and third embodiments, with the power loss replacing references to the input power.

Alternatively, a ratio between the power input to the IBA power system and the power output by the system may be taken to provide a measure of the system efficiency. As a further example of an efficiency measure, the efficiency measuring unit 770 may calculate the efficiency measure as $1-P_{loss}/P_{in}$.

Furthermore, although the voltage controller 700 is arranged to function autonomously in the above-described embodiments to monitor values of the determined efficiency measure in Box 3, and to perform the optimisation process when certain criteria are met, as explained above, the voltage controller may alternatively be arranged to repeat the voltage optimisation process via Box 1 or Box 4 in accordance with an external instructing signal (for example, a PMBus command) which has been received via the I/O interface 710.

If the optimization is running and an increase in load occurs, it is desirable for the optimization to stop and wait for the change to stabilize, and for a new optimization to then be initiated. Therefore, the voltage controller 700 of the above embodiments is preferably arranged to communicate with POLs 500-1 to 500-K and determine, from values of the output currents $I_{o1}, \ldots, I_{oK}$ (and optionally also the output voltages $V_{o1}, \ldots, V_{oK}$) provided thereby via the MB 800, a value of the power output by the POLs when the optimization is initiated. The power output value may be stored in the working memory 730. Every time the bus voltage is changed, the efficiency measuring unit 770 is preferably arranged check if the output power has changed by comparing the power output value obtained after an IBV increment/decrement with the aforementioned stored value. The change must be larger than a pre-defined margin since the output power will vary with the bus voltage.

If the load situation increases, the optimization processes described above will increase the IBV to avoid over-current, and if the load then decreases to a low level the optimal bus voltage is moved to a lower level. The optimization process will then try to lower the bus voltage since it has detected a decrease in output power. Since there may be a maximum in power dissipation for the system, the input power may increase with lowered bus voltage and the optimization will finish even though it has not found the global minimum for the input power. To solve this problem, the optimization process can be modified so that if a large drop in output power occurs, the bus voltage is set to a pre-defined value. This will cause the input power to change to the other side of its maximum and the optimization to run as intended.

The invention claimed is:

1. A voltage controller operable to generate control signals for controlling an intermediate bus voltage ($V_{IB}$) in an intermediate bus architecture power system, the intermediate bus voltage comprising a voltage output from a first stage DC-to-DC power converter to at least one second stage DC-to-DC power converter via an intermediate voltage bus in the intermediate bus architecture power system, the voltage controller comprising:
   a receiver operable to receive in a first iteration and a next iteration subsequent to the first iteration, measured values of current input to the first stage DC-to-DC power converter or current and voltage output by the first stage DC-to-DC power converter;
   an efficiency measuring unit operable to determine a measure of an efficiency of the intermediate bus architecture power system in accordance with the received values, said efficiency measuring unit being operable to:
      determine a first value of the efficiency measure using the received values from the first iteration corresponding to a first intermediate bus voltage;
      determine a second value of the efficiency measure using the received values from the next subsequent iteration corresponding to a second intermediate bus voltage higher than the first intermediate bus voltage; and
      compare the second value of the efficiency measure to the first value of the efficiency measure to determine whether the efficiency of the intermediate bus architecture increased or decreased from the first iteration to the next iteration; and
   a control signal generator operable to generate control signals to cause the first stage DC-to-DC converter to set the intermediate bus voltage ($V_{IB}$) to a voltage higher than the second intermediate bus voltage if the second efficiency measure value represents a higher system efficiency than the first efficiency measure value, and to a voltage lower than the first intermediate bus voltage if the second efficiency measure value represents a lower system efficiency than the first efficiency measure value.

2. The voltage controller according to claim 1, wherein:
the efficiency measuring unit is operable to:
   determine a first value of a current input to the intermediate bus architecture power system, as said first efficiency measure value, using the received values from the first iteration corresponding to the first intermediate bus voltage; and
   determine a second value of the current input to the intermediate bus architecture power system, as said second efficiency measure value, using the received values from the next subsequent iteration corresponding to the second intermediate bus voltage; and
the control signal generator is operable to generate, in dependence on the first and second values of the current input, control signals to cause the first stage DC-to-DC converter to set the intermediate bus voltage ($V_{IB}$) to a voltage higher than the second intermediate bus voltage if the second input current value is smaller than the first input current value, and to a voltage lower than the first intermediate bus voltage if the second input current value is greater than the first input current value.

3. The voltage controller according to claim 1, wherein:
the efficiency measuring unit is operable to:
   determine a first value of a power input to the intermediate bus architecture power system, as said first efficiency measure value, using the received values from the first iteration corresponding to the first intermediate bus voltage; and
   determine a second value of the power input, as said second efficiency measure value, using the received values from the next subsequent iteration corresponding to the second intermediate bus voltage; and
the control signal generator is operable to generate, in dependence on the first and second values of the power input, control signals to cause the first stage DC-to-DC converter to set the intermediate bus voltage ($V_{IB}$) to a voltage higher than the second intermediate bus voltage if the second input power value is smaller than the first input power value, and to a voltage lower than the first intermediate bus voltage if the second input power value is greater than the first input power value.

4. The voltage controller according to claim 1, wherein:
the receiver is further operable to receive measured values of the current output by each second stage DC-to-DC power converter;
the efficiency measuring unit is operable to:
   calculate a first value of a power loss in the intermediate bus architecture power system, as said first efficiency measure value, using the received values from the first iteration corresponding to the first intermediate bus voltage; and
   calculate a second value of the power loss, as said second efficiency measure value, using the received values from the next subsequent iteration corresponding to the second intermediate bus voltage; and
the control signal generator is operable to generate, in dependence on the first and second power loss values, control signals to cause the first stage DC-to-DC converter to set the intermediate bus voltage ($V_{IB}$) to a voltage higher than the second intermediate bus voltage if the second power loss value is smaller than the first power loss value, and to a voltage lower than the first intermediate bus voltage if the second power loss value is greater than the first power loss value.

5. The voltage controller according to claim 1, wherein the efficiency measuring unit and the control signal generator are operable to determine the efficiency measure and generate control signals to set the intermediate bus voltage ($V_{IB}$) iteratively, such that:

the intermediate bus voltage is repeatedly increased from an initial value, and then decreased to substantially the preceding value when the second efficiency measure value represents a lower system efficiency than the first efficiency measure value; or the intermediate bus voltage is repeatedly decreased from an initial value, and then increased to substantially the preceding value when the second efficiency measure value represents a higher system efficiency than the first efficiency measure value.

6. The voltage controller according to claim 5, wherein:
the receiver is arranged to receive a measured value of the current output by the first stage DC-to-DC power converter; and the voltage controller further comprises a current monitor operable to determine whether the measured value of the current output by the first stage DC-to-DC power converter has exceeded a threshold, and operable, when the output current has exceeded the threshold and only where the intermediate bus voltage has been increased in a previous iteration, to cause the control signal generator to generate control signals to set the intermediate bus voltage ($V_{IB}$) to a predetermined value.

7. The voltage controller according to claim 5, wherein:
the receiver is arranged to receive a measured value of the current output by the first stage DC-to-DC power converter; and the voltage controller further comprises a current monitor operable to determine whether the value of the current output by the first stage DC-to-DC power converter has exceeded a threshold, and operable, when the output current has exceeded the threshold, to cause the control signal generator to generate control signals to iteratively increase the intermediate bus voltage ($V_{IB}$) until the output current falls below said threshold.

8. The voltage controller according to claim 7, wherein said threshold is only a portion of the maximum output current rating of the first stage DC-to-DC power converter.

9. The voltage controller according to claim 1, wherein the control signal generator is operable to generate control signals to cause the first stage DC-to-DC power converter to set the intermediate bus voltage ($V_{IB}$) to a voltage higher than the second intermediate bus voltage if the second efficiency measure value represents a system efficiency that is higher by at least a first predetermined amount than the first efficiency measure value, and to a voltage lower than the first intermediate bus voltage if the second efficiency measure value represents a system efficiency that is lower by at least a second predetermined amount than the first efficiency measure value.

10. The voltage controller according to claim 5, wherein the efficiency measuring unit and the control signal generator are operable, after the intermediate bus voltage has been decreased or increased to its preceding value, to monitor the efficiency measure and repeat the setting of the intermediate bus voltage ($V_{IB}$) when the value of the efficiency measure is determined to have changed by at least a third predetermined amount.

11. The voltage controller according to claim 1, wherein the efficiency measuring unit is operable to determine the first value of the efficiency measure using received values corresponding to an intermediate bus voltage which is a decreased value of the second intermediate bus voltage value.

12. An intermediate bus architecture power system having the voltage controller according to claim 1.

13. A method of generating control signals for controlling an intermediate bus voltage ($V_{IB}$) in an intermediate bus architecture power system, the intermediate bus voltage comprising a voltage output from a first stage DC-to-DC power converter to at least one second stage DC-to-DC power converter via an intermediate voltage bus in the intermediate bus architecture power system, the method comprising:

receiving in a first iteration and a next iteration subsequent to the first iteration, measured values of the current input to the first stage DC-to-DC power converter, or the current and voltage output by the first stage DC-to-DC power converter;

determining a measure of an efficiency of the intermediate bus architecture power system, in accordance with the received values, by:
determining a first value of the efficiency measure using the received values from the first iteration corresponding to a first intermediate bus voltage;
determining a second value of the efficiency measure using the received values from the next subsequent iteration corresponding to a second intermediate bus voltage higher than the first intermediate bus voltage; and
comparing the second value of the efficiency measure to the first value of the efficiency measure to determine whether the efficiency of the intermediate bus architecture increased or decreased from the first iteration to the next iteration; and generating control signals to cause the first stage DC-to-DC power converter to set the intermediate bus voltage ($V_{IB}$) to a voltage higher than the second intermediate bus voltage if the second efficiency measure value represents a higher system efficiency than the first efficiency measure value, and to a voltage lower than the first intermediate bus voltage if the second efficiency measure value represents a lower system efficiency than the first efficiency measure value.

14. The method according to claim 13, wherein:
determining the efficiency measure comprises:
determining a first value of a current input to the intermediate bus architecture power system, as said first efficiency measure value, using the received values from the first iteration corresponding to the first intermediate bus voltage; and
determining a second value of the current input to the intermediate bus architecture power system, as said second efficiency measure value, using the received values from the next subsequent iteration corresponding to the second intermediate bus voltage; and generating the control signals comprises generating, in dependence on the first and second values of the current input, control signals to cause the first stage DC-to-DC converter to set the intermediate bus voltage ($V_{IB}$) to a voltage higher than the second intermediate bus voltage if the second input current value is smaller than the first input current value, and to a voltage lower than the first intermediate bus voltage if the second input current value is greater than the first input current value.

15. The method according to claim 13, wherein:
determining the efficiency measure comprises:
determining a first value of a power input to the intermediate bus architecture power system, as said first efficiency measure value, using the received values from the first iteration corresponding to the first intermediate bus voltage; and
determining a second value of the power input, as said second efficiency measure value, using the received values from the next subsequent iteration corresponding to the second intermediate bus voltage; and
generating the control signals comprises generating, in dependence on the first and second values of the power input, control signals to cause the first stage DC-to-DC converter to set the intermediate bus voltage ($V_{IB}$) to a voltage higher than the second intermediate bus voltage if the second input power value is smaller than the first input power value, and to a voltage lower than the first intermediate bus voltage if the second input power value is greater than the first input power value.

16. The method according to claim 13, wherein:
in the receiving process, measured values of the current output by one or more of the second stage DC-to-DC power converters (500-1 to 500-K) are received;
determining the efficiency measure comprises:
calculating a first value of a power loss in the intermediate bus architecture power system, as said first efficiency measure value, using the received values from the first iteration corresponding to the first intermediate bus voltage; and
calculating a second value of the power loss, as said second efficiency measure value, using the received values from the next subsequent iteration corresponding to the second intermediate bus voltage; and
generating the control signals comprises generating, in dependence on the first and second power loss values, control signals to cause the first stage DC-to-DC converter to set the intermediate bus voltage ($V_{IB}$) to a voltage higher than the second intermediate bus voltage if the second power loss value is smaller than the first power loss value, and to a voltage lower than the first intermediate bus voltage if the second power loss value is greater than the first power loss value.

17. The method according to claim 13, further comprising determining the efficiency measure and generating control signals to set the intermediate bus voltage ($V_{IB}$) iteratively, such that:
the intermediate bus voltage is repeatedly increased from an initial value, and then decreased to substantially the preceding value when the second efficiency measure value represents a lower system efficiency than the first efficiency measure value; or
the intermediate bus voltage is repeatedly decreased from an initial value, and then increased to substantially the preceding value when the second efficiency measure value represents a higher system efficiency than the first efficiency measure value.

18. The method according to claim 17, further comprising:
receiving a measured value of the current output by the first stage DC-to-DC power converter;
determining whether the measured value of the current output by the first stage DC-to-DC power converter has exceeded a threshold and, when the output current has exceeded the threshold and only where the intermediate bus voltage has been increased in a previous iteration, generating control signals to set the intermediate bus voltage ($V_{IB}$) to a predetermined value.

19. The method according to claim 17, further comprising:
receiving a measured value of the current output by the first stage DC-to-DC power converter;
determining whether the measured value of the current output by the first stage DC-to-DC power converter has exceeded a threshold and, when the output current has exceeded the threshold, generating control signals to iteratively increase the intermediate bus voltage ($V_{IB}$) until the output current falls below said threshold.

20. The method according to claim 19, wherein said threshold is only a portion of the maximum output current rating of the first stage DC-to-DC power converter.

21. The method according to claim 13, further comprising generating control signals to cause the first stage DC-to-DC converter to set the intermediate bus voltage ($V_{IB}$) to a voltage higher than the second intermediate bus voltage if the second efficiency measure value represents a system efficiency that is higher by at least a first predetermined amount than the first efficiency measure value, and to a voltage lower than the first intermediate bus voltage if the second efficiency measure value represents a system efficiency that is lower by at least a second predetermined amount than the first efficiency measure value.

22. The method according to claim 17, further comprising, after the intermediate bus voltage has been increased or decreased to its preceding value, monitoring the efficiency measure and repeating the setting of the intermediate bus voltage ($V_{IB}$) when the value of the efficiency measure is determined to have changed by at least a third predetermined amount.

23. The method according to claim 13, comprising determining the first value of the efficiency measure using received values corresponding to an intermediate bus voltage which is a decreased value of the second intermediate bus voltage value.

24. A non-transitory computer-readable storage medium storing computer program instructions which, when executed by a processor, cause the processor to generate control signals for controlling an intermediate bus voltage ($V_{IB}$) in an intermediate bus architecture power system, the intermediate bus voltage comprising a voltage output from a first stage DC-to-DC power converter to at least one second stage DC-to-DC power converter via an intermediate voltage bus in the intermediate bus architecture power system, the generation comprising:
receiving in a first iteration and a next iteration subsequent to the first iteration, measured values of a current input to the first stage DC-to-DC power converter, or current and voltage output by the first stage DC-to-DC power converter;
determining a measure of an efficiency of the intermediate bus architecture power system, in accordance with the received values, by:
determining a first value of the efficiency measure using the received values from the first iteration corresponding to a first intermediate bus voltage;
determining a second value of the efficiency measure using the received values from the next subsequent iteration corresponding to a second intermediate bus voltage higher than the first intermediate bus voltage; and
comparing the second value of the efficiency measure to the first value of the efficiency measure to determine whether the efficiency of the intermediate bus architecture increased or decreased from the first iteration to the next iteration; and
generating control signals to cause the first stage DC-to-DC power converter to set the intermediate bus voltage ($V_{IB}$) to a voltage higher than the second intermediate bus voltage if the second efficiency measure value represents a higher system efficiency than the first efficiency measure value, and to a voltage lower than the first intermediate bus voltage if the second efficiency measure value represents a lower system efficiency than the first efficiency measure value.

25. A method of controlling an intermediate bus voltage ($V_{IB}$) in an intermediate bus architecture power system, the intermediate bus voltage comprising a voltage output from a first stage DC-to-DC power converter to at least one second stage DC-to-DC power converter via an intermediate voltage bus in the intermediate bus architecture power system, wherein the method begins with a high nominal bus voltage, the method comprising the steps of:

a). decreasing the bus voltage in a predefined step size and determining whether a power or current input to the intermediate bus architecture increased or decreased as a result;
 b). upon determining that the input power or current decreased in step a), iteratively repeating step a) until a decrease in the bus voltage results in an increase in the input power or current;
 c). when the decrease in the bus voltage results in an increase in the input power or current in step b), increasing the bus voltage to a level in the previous iteration to obtain an optimum voltage setting;
 d). monitoring a load level of the intermediate bus architecture to determine when the load decreases or increases by more than a threshold amount;
 e). when the load decreases by more than the threshold amount, returning to step a);
 f). when the load increases by more than the threshold amount, increasing the bus voltage in a predefined step size and determining whether the input power or current increased or decreased as a result;
 g). upon determining that the input power or current decreased in step f), iteratively repeating step f) until an increase in the bus voltage results in an increase in the input power or current;
 h). when the increase in the bus voltage results in an increase in the input power or current in step g), decreasing the bus voltage to a level in the previous iteration to obtain a new optimum voltage setting; and
 i). returning to step d).

* * * * *

UNITED STATES PATENT AND TRADEMARK OFFICE
CERTIFICATE OF CORRECTION

PATENT NO. : 9,214,858 B2  
APPLICATION NO. : 13/810484  
DATED : December 15, 2015  
INVENTOR(S) : Holmberg et al.

It is certified that error appears in the above-identified patent and that said Letters Patent is hereby corrected as shown below:

Specification

In Column 8, Line 24, delete "memory 740" and insert -- memory 730 --, therefor.

In Column 8, Line 28, delete "$V_{IBnom}-\Delta B_{IB}$." and insert -- $V_{IBnom}-\Delta V_{IB}$. --, therefor.

In Column 9, Line 25, delete "$(P_{in} \leq P_{old}+P_{HS})$" and insert -- $(P_{in} > P_{old}+P_{HS})$ --, therefor.

In Column 10, Line 11, delete "$P_{in} \leq P_{old}+P_Q$" and insert -- $P_{in} > P_{old}+P_Q$ --, therefor.

In Column 11, Line 6, delete "$(P_{in} \leq P_{old}+P_{HS})$" and insert -- $(P_{in} > P_{old}+P_{HS})$ --, therefor.

In Column 12, Line 19, delete "memory 740" and insert -- memory 730 --, therefor.

In Column 13, Line 46, delete "$I_{DCH} \leq I_{old}+I_Q$" and insert -- $I_{DCH} > I_{old}+I_Q$ --, therefor.

In Column 14, Line 6, delete "$I_{HS}$" and insert -- $I_{HS}$ in --, therefor.

In Column 14, Line 18, delete "$(I_{IB} \leq I_{max})$" and insert -- $(I_{IB} > I_{max})$ --, therefor.

In Column 14, Line 39, delete "$(I_{DCH} \leq I_{old}+I_{HS})$" and insert -- $(I_{DCH} > I_{old}+I_{HS})$ --, therefor.

In Column 14, Line 60, delete "$I_{IB}=I_{max}$." and insert -- $I_{IB}=I_{max}$, --, therefor.

In Column 15, Line 53, delete "me" and insert -- be --, therefor.

Claims

In Column 21, Line 15, in Claim 16, delete "converters (500-1 to 500-K)" and insert -- converters --, therefor.

Signed and Sealed this  
Twenty-eighth Day of June, 2016

Michelle K. Lee  
*Director of the United States Patent and Trademark Office*